(12) United States Patent
Wang et al.

(10) Patent No.: US 8,909,160 B2
(45) Date of Patent: Dec. 9, 2014

(54) METHOD, DEVICE, AND SYSTEM OF RESOURCE CONFIGURATION

(71) Applicant: Huawei Technologies Co., Ltd., Shenzhen, Guangdong (CN)

(72) Inventors: Shukun Wang, Beijing (CN); Dingzhang Dai, Shanghai (CN); Xin Huang, Shanghai (CN); Boya Lv, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 13/673,572

(22) Filed: Nov. 9, 2012

(65) Prior Publication Data
US 2013/0070709 A1 Mar. 21, 2013

Related U.S. Application Data

(63) Continuation of application No. 13/097,849, filed on Apr. 29, 2011, now Pat. No. 8,335,477, which is a continuation of application No. PCT/CN2009/073642, filed on Aug. 31, 2009.

(30) Foreign Application Priority Data

Oct. 31, 2008 (CN) .......................... 2008 1 0217501

(51) Int. Cl.
*H04B 7/005* (2006.01)
*H04B 7/00* (2006.01)
*H04L 25/00* (2006.01)

(52) U.S. Cl.
CPC ...................................... *H04L 25/00* (2013.01)
USPC ........... 455/69; 455/452.1; 455/509; 455/522

(58) Field of Classification Search
CPC ....................... H04W 28/0221; H04W 72/0473
USPC ............ 455/69, 67.11, 452.1, 509, 67.7, 450, 455/452.2, 453, 426.1, 522, 414.1; 370/329, 331, 251
See application file for complete search history.

(56) References Cited

U.S. PATENT DOCUMENTS 8,249,521 B2 8/2012 Wang et al.
2006/0092876 A1* 5/2006 Kwak et al. .................... 370/329

(Continued)

FOREIGN PATENT DOCUMENTS

CN 1774119 A 5/2006
CN 1917661 A 2/2007

(Continued)

OTHER PUBLICATIONS

NEC, "Indication for E-DPCCH Power Boosting support status", 3GPP TSG RAN WG2 meeting #62, R2-082813, Kansas City, Missouri, US, May 5-9, 2008, total 8 pages.

(Continued)

*Primary Examiner* — John J Lee
(74) *Attorney, Agent, or Firm* — Huawei Technologies Co., Ltd.

(57) ABSTRACT

A method and a communications system are provided. The system includes a base station and a RNC. The base station does not report the RNC whether the base station supports an E-DPCCH power boost capability. The RNC is also informed whether a UE supports and E-DPCCH power boost capability. If the UE supports E-DPCCH power boost function, the RCE designates by default that the base station also supports the E-DPCCH power boost function even though the base station does not report whether it supports or not, and configures resources for the base station to perform channel estimation by using the E-DPCCH power boost feature for the UE. Through the solution of the system, the accuracy of channel estimation can be improved and thus a bit error rate in high-speed data transmission can be reduced.

16 Claims, 5 Drawing Sheets

(56) References Cited

U.S. PATENT DOCUMENTS

| | | |
|---|---|---|
| 2007/0253450 A1 | 11/2007 | Kuroda et al. |
| 2008/0198831 A1 | 8/2008 | Zhang et al. |
| 2008/0200200 A1 | 8/2008 | Usuda et al. |
| 2008/0205329 A1 | 8/2008 | Dominique et al. |
| 2009/0163199 A1* | 6/2009 | Kazmi et al. .................. 455/425 |

FOREIGN PATENT DOCUMENTS

| | | |
|---|---|---|
| CN | 101002405 A | 7/2007 |
| CN | 101115282 A | 1/2008 |
| CN | 101277481 A | 10/2008 |
| CN | 101296003 A | 10/2008 |
| EP | 1777841 A1 | 4/2007 |
| EP | 1873936 A1 | 1/2008 |
| EP | 1954065 A1 | 8/2008 |
| WO | 2008118081 A2 | 10/2008 |
| WO | 2010048835 A1 | 5/2010 |

OTHER PUBLICATIONS

NEC, "Indication for E-DPCCH Power Boosting support status", 3GPP TSG RAN WG2 meeting #62, R2-082814, Kansas City, Missouri, US, May 5-9, 2008, total 8 pages.

First office action issued in corresponding Chinese patent application No. 200810217501.X, Sep. 7, 2011, and English translation thereof, total 20 pages.

Second office action issued in corresponding Chinese patent application No. 200810217501.X, May 3, 2012, and English translation thereof, total 7 pages.

Search report issued in corresponding European patent application No. 09823027.9, Feb. 23, 2012, total 9 pages.

First office action issued in corresponding Mexican patent application No. MX/a/2011/004538, Sep. 26, 2012, and English translation thereof, total 4 pages.

International search report and Written Opinion issued in corresponding PCT application No. PCT/CN2009/073642, Dec. 17, 2009, total 8 pages.

3GPP TS 25.331 V8.4.0, "3rd Generation Partnership Project; Technical Specification Group Radio Access Network; Radio Resource Control(RRC); Protocol Specification (Release 8)," Sep. 2008, total 1543 pages.

3GPP TS 25.423 V7.10.0, "3rd Generation Partnership Project; Technical Specification Group Radio Access Network; UTRAN Iur interface RNSAP signalling (Release 7)," Sep. 2008, total 861 pages.

3GPP TS 25.433 V7.10.0, "3rd Generation Partnership Project; Technical Specification Group Radio Access Network; UTRAN Iub interface Node B Application Part (NBAP) signalling (Release 7)," dated Sep. 2008, total 998 pages.

First office action issued in corresponding U.S. Appl. No. 13/097,849, Sep. 5, 2012, total 14 pages.

First office action issued in corresponding U.S. Appl. No. 13/338,201, Feb. 15, 2012, total 19 pages.

* cited by examiner

METHOD, DEVICE, AND SYSTEM OF RESOURCE CONFIGURATION

CROSS-REFERENCE TO RELATED APPLICATIONS

This application is a continuation of U.S. patent application Ser. No. 13/097,849, filed on Apr. 29, 2011, which is a continuation of International Application No PCT/CN2009/073642, filed on Aug. 31, 2009 and which claims priority to Chinese Patent Application No. 200810217501.X, filed on Oct. 31, 2008, each of which is hereby incorporated by reference in its entirety.

This application is related to U.S. patent application Ser. No. 13/338,201, filed on Dec. 27, 2011 and issued on Aug. 21, 2012 as U.S. Pat. No. 8,249,521.

FIELD OF THE INVENTION

The present invention relates to the field of mobile communications technologies, and more particularly to a method, device and system of resource configuration.

BACKGROUND

In the field of mobile communications, with the development of various services, users have higher requirements on the data transmission speed. In order to support higher speed data service, lower delay, higher throughput and higher spectrum utilization, two new technologies are proposed, that is, High Speed Downlink Packet Access (HSDPA) and High Speed Uplink Packet Access (HSUPA) technologies.

New physical channels are introduced into the HSUPA technology. The new physical channels include an Enhanced Dedicated Channel (E-DCH) Dedicated Physical Data Channel (E-DPDCH) for bearing uplink data information of the E-DCH and an E-DCH Dedicated Physical Control Channel (E-DPCCH) for bearing uplink signaling information of the E-DCH.

Before the new physical channels are introduced, due to the higher data speed and larger data blocks for transmitting data, the performance of the channel estimation performed according to a Dedicated Physical Control Channel (DPCCH) becomes worse, and cannot meet the performance requirements for high-speed data transmission demodulation. The problems are caused by the following reasons. In order to optimize the performance of the uplink high-speed transmission, it is necessary to control the power difference between the E-DPCCH and the DPCCH in a certain range; to ensure that the power difference is controlled in the range, it is necessary to increase the power of the DPCCH and to increase the DPCCH signal-to-interference ratio (SIR). However, the process of an out loop power control (OLPC) for adjusting the signal-to-interference ratio target (SIRtar) is slow. If the SIR is adjusted too fast, the OLPC cannot meet the requirement of the SIR change. Therefore, the following problem may occur: when a large SIR is required at a high speed, the SIRtar is still a low value. At this time, the bit error rate at the high speed is significantly increased, and the throughput is severely influenced.

Therefore, after the E-DPCCH is introduced, in order to improve the accuracy of channel estimation, the E-DPCCH is added into the channel estimation. When the E-DPCCH is added into the channel estimation, through the power boost characteristic of the E-DPCCH, the power difference between the E-DPCCH and the DPCCH can be controlled in a range allowed by the performance, and at the same time, the requirement for the signal-to-interference ratio at power change is met. In this way, the accuracy of the channel estimation is improved significantly.

However, in the prior art, a radio network controller (RNC) cannot allocate E-DPCCH power boost resources to a radio link (RL) of a UE having the E-DPCCH power boost capability when performing resource configuration. As a result, even when the UE has the E-DPCCH power boost capability, the UE cannot perform the channel estimation by using the power boost characteristic of the E-DPCCH. Therefore, the problems of inaccurate channel estimation and lower data demodulation performance still occur during high-speed data transmission.

SUMMARY

Embodiments of the present invention provide a resource configuration method, so that an RNC can allocate corresponding radio resources for a Node B and a UE having an E-DPCCH power boost capability.

Embodiments of the present invention further provide a resource configuration device and system.

In order to solve the above technical problems, the embodiments of the present invention provide the following technical solutions:

A resource configuration method provided in an embodiment of the present invention includes the following steps:

Capability information of a base station (BS) is acquired, in which the capability information of the BS includes information indicating whether the BS has a channel power boost capability.

Capability information of a user equipment (UE) is acquired, in which the capability information of the UE includes information indicating whether the UE has the channel power boost capability.

If the UE and the BS both have the channel power boost capability, notify the BS to configure resources for performing channel estimation by using the channel power boost capability for the UE.

Another resource configuration method provided in an embodiment of the present invention includes the following steps:

Capability information of a UE is acquired, in which the capability information of the UE includes information indicating whether the UE has a channel power boost capability.

If the UE has the channel power boost capability, notify a BS to configure resources for performing channel estimation by using the channel power boost capability for the UE.

Another resource configuration method provided in an embodiment of the present invention includes the following steps:

A BS receives a notification sent by a radio network controller (RNC), in which the notification is used to configure recourses to perform channel estimation by using a channel power boost capability for a UE.

If the BS does not have the channel power boost capability, the BS configures resources for performing channel estimation by using a Dedicated Physical Control Channel (DPCCH) for the UE.

An RNC provided in an embodiment of the present invention includes a receiving module and a notifying module.

The receiving module is adapted to receive capability information of a UE and a BS, in which the capability information of the UE includes information indicating whether the UE has a channel power boost capability, and the capability information of the BS includes information indicating whether the BS has the channel power boost capability.

The notifying module is adapted to notify the BS to configure resources for performing channel estimation by using the channel power boost capability for the UE if the UE and the BS both have the channel power boost capability.

Another RNC provided in an embodiment of the present invention includes a receiving module and a notifying module.

The receiving module is adapted to receive capability information of a UE, in which the capability information of the UE includes information indicating whether the UE has a channel power boost capability.

The notifying module is adapted to notify a BS to configure resources for performing channel estimation by using the channel power boost capability for the UE through a sending module if the UE has the channel power boost capability.

A BS provided in an embodiment of the present invention includes a receiving module and a processing module.

The receiving module is adapted to receive a notification, in which the notification is used to configure for a UE to perform channel estimation by using a channel power boost capability.

The processing module is adapted to configure resources for performing the channel estimation by using the channel power boost capability according to the notification received by the receiving module if the BS has the channel power boost capability.

A resource configuration system provided in an embodiment of the present invention includes an RNC communicating with a BS.

The RNC is adapted to acquire capability information of the BS, in which the capability information of the BS includes information indicating whether the BS has a channel power boost capability.

The RNC is also adapted to acquire capability information of a UE, in which the capability information of the UE includes information indicating whether the UE has the channel power boost capability.

The RNC is also adapted to notify the BS to configure resources for performing channel estimation by using the channel power boost capability for the UE if the UE and the BS both have the channel power boost capability.

A resource configuration system provided in an embodiment of the present invention includes a BS communicating with an RNC.

The BS is adapted to receive a notification sent by the RNC, in which the notification is used to configure for a UE to perform channel estimation by using a channel power boost capability.

The BS is also adapted to configure resources for performing the channel estimation by using a DPCCH for the UE if the BS does not have the channel power boost capability.

The embodiments of the present invention provide a method, device, and system of resource configuration. In the embodiments, by acquiring capability information of a Node B and capability information of a UE, and according to the acquired capability information, the Node B is notified to configure resources for performing channel estimation by using the channel power boost capability for the current UE when the UE and the Node B both have the channel power boost capability. Therefore, when the UE and the Node B both have the channel power boost capability, the UE can perform the channel estimation by using the channel power boost capability, so as to improve the accuracy of the channel estimation, and to reduce a bit error rate in high-speed data transmission.

DETAILED DESCRIPTION OF THE EMBODIMENTS

To make the technical solutions, objectives and merits of the present invention clearer, the present invention is described in detail with reference to the accompanying drawings in the following.

In the following embodiments, a Wideband Code Division Multiple Access (WCDMA) system is taken as an example of a radio communication system. However, the present invention can be widely used in other radio communication systems, for example, a Long Term Evolution (LTE) system. The RNC, Node B, and UE have different names in other radio communication systems, which, however, are also applicable to the technical solutions provided by the embodiments of the present invention.

When a Radio Resource Control (RRC) connection is set up between a UE and an RNC, the UE reports whether the UE has the E-DPCCH power boost capability to the RNC through an RRC Connection Request message or an RRC Connection Setup Complete message. However, when the RNC and the Node B synchronize the configuration and the capability information of the Node B, the Node B may not report whether the Node B has the E-DPCCH power boost capability actively. Therefore, the RNC cannot acquire correctly the capability information of the Node B, and cannot correctly configure the radio resources.

For example, the RNC may consider that the Node B does not have the E-DPCCH power boost capability by default if the Node B does not report to have the capability, so when performing radio link (RL) configuration or RL re-configuration, the RNC does not notify the Node B to allocate E-DPCCH power boost resources to the RL of the current UE. That is, the Node B does not configure to perform the channel estimation by using the E-DPCCH power boost characteristic for the UE. In this case, even if the UE has the E-DPCCH power boost capability, the E-DPCCH power boost characteristic cannot be used, and the UE and the Node B still perform the channel estimation by using the DPCCH, resulting in the problem of low accuracy of the channel estimation and a high bit error rate in high-speed data transmission.

Therefore, to configure optimal radio resources for the Node B and the UE, it is required to clearly inform the RNC whether the Node B has the E-DPCCH power boost capability.

Figure 1:
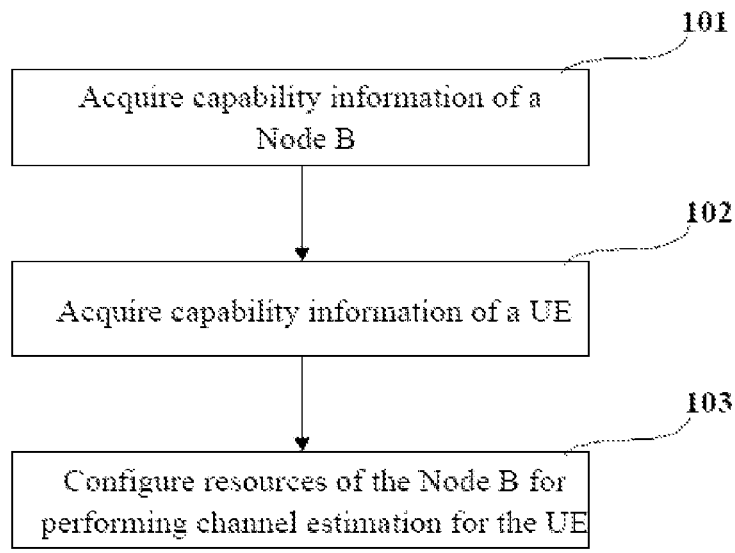
FIG. 1 is a flow chart of a resource configuration method according to a first embodiment of the present invention.

FIG. 1 shows a resource configuration method according to a first embodiment of the present invention. As shown in FIG. 1, the method includes the following steps:

Step 101: Acquire capability information of a Node B, in which the capability information includes information indicating whether the Node B has an E-DPCCH power boost capability.

Step 102: Acquire capability information of a UE, in which the capability information includes information indicating whether the UE has the E-DPCCH power boost capability.

Step 103: When the UE and the Node B both have the E-DPCCH Power boost capability, notify the Node B to configure resources for performing channel estimation by using the channel power boost capability for the UE.

The implementation of the steps in this embodiment is described in detail in the following.

In this embodiment, an RNC acquires the capability information of the Node B and the capability information of the UE, and according to the acquired capability information, optimal resources of the Node B for channel estimation are configured for the current UE, so that when the UE and the Node B both have the channel power boost capability, the Node B can perform the channel estimation by using the channel power boost capability. Therefore, the accuracy of the channel estimation is improved, and the bit error rate in high-speed data transmission is reduced.

Figure 2:
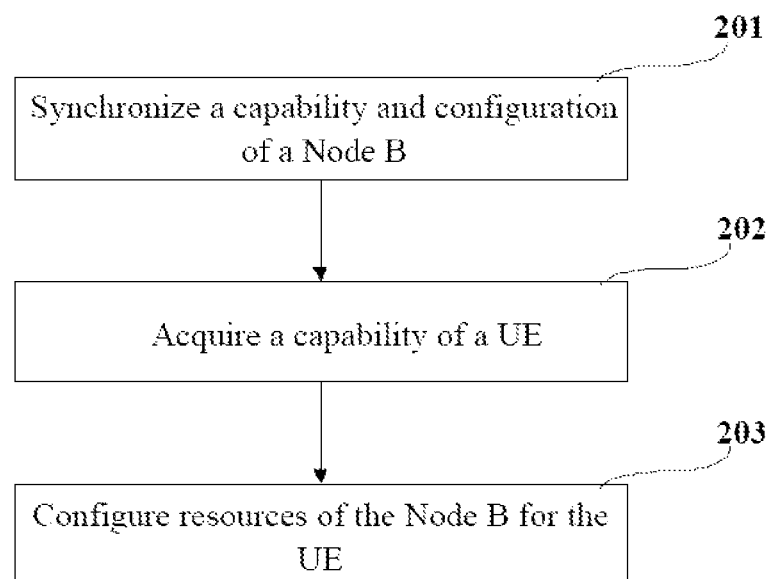
FIG. 2 is a flow chart of a resource configuration method according to a second embodiment of the present invention.

Next, a second embodiment of the present invention is described in detail with reference to FIG. 2. The second embodiment also provides a resource configuration method, which includes the following steps:

Step 201: An RNC and a Node B synchronize configuration and capability information of the Node B.

In step 201, the RNC synchronizes the configuration and the capability information of the Node B through an Audit procedure or a Resource Status Indication procedure, or through a combination thereof.

When the RNC and the Node B implement the synchronization of the configuration and the capability information of the Node B through the Audit procedure, the RNC sends a Resource Audit Request to the Node B to start the Audit procedure. During this procedure, the RNC acquires the configuration and the capability information of the Node B through an Audit Response message sent by the Node B. Through this procedure, the RNC may complete the synchronization of the configuration and a logic resource state of the Node B.

In order to enable the RNC to be clearly informed whether the Node B has the E-DPCCH power boost capability, the Node B carries an information element (IE) for indicating that the Node B has or does not have the E-DPCCH power boost capability in the Audit Response message.

Therefore, the RNC can be clearly informed whether the Node B can use the E-DPCCH power boost characteristic according to the IE indicating whether the Node B has the E-DPCCH power boost capability carried in the Audit Response message.

The Audit procedure can be triggered under many conditions, and is not necessarily triggered just before the subsequent steps. For example, when the RNC is started or switched, or the cell status changes, the RNC initiates the Audit procedure.

If the RNC implements, with the Node B, the synchronization of the configuration and the capability information of the Node B through the Resource Status Indication procedure, the RNC receives a Resource Status Indication message sent by the Node B, and according to the message, completes the synchronization of the configuration and the capability information of the Node B. The Resource State Indication message carries a plurality of IEs for indicating the configuration and a logic resource state of the Node B, including an IE for indicating whether the Node B has the E-DPCCH power boost capability.

The RNC can be clearly informed whether the Node B can perform the channel estimation by using the E-DPCCH power boost characteristic according to the IE indicating whether the Node B has the E-DPCCH power boost capability carried in the Resource Status Indication message.

The Resource Status Indication message sent to the RNC by the Node B can be triggered under many conditions, and is not necessarily triggered just before the subsequent steps. For example, the conditions such as increasing local cells of the Node B, deleting local cells of the Node B, and changes of the capability of the local cells may trigger the Node B to send the Resource Status Indication message to the RNC.

The Audit procedure and Resource Status Indication procedure can make the RNC be clearly informed whether the Node B has the E-DPCCH power boost capability. Furthermore, the combination of the Audit procedure and Resource Status Indication procedure can also complete the synchronization process in which the RNC acquires the capability information of the Node B. As the triggering conditions of the Audit procedure and the Resource Status Indication procedure are different, the sequence of triggering the two processes may be exchanged, and the trigger of the two processes is not mutually exclusive; instead, the two procedures can be combined together. In this way, it is more comprehensively ensured that the RNC accurately knows whether the Node B can perform the channel estimation by using the E-DPCCH power boost characteristic when the UE initiates the RRC connection setup. Therefore, the accuracy of the channel estimation of the UE and the Node B is ensured, and the bit error rate in high-speed data transmission between the UE and the Node B is reduced.

Step 202: The RNC receives a message sent by the UE, and is informed of the capability of the UE.

When the UE initiates the RRC connection, the UE starts the RRC connection setup process by sending an RRC Connection Request message to the RNC. The RRC Connection Request message may carry a part of the capability of the UE. The RRC Connection Setup Complete message sent to the RNC by the UE carries the complete capability of the UE that is not carried in the RRC Connection Request message. By receiving the two messages, the RNC is informed of the complete capability of the UE.

The RNC acquires the complete capability of the UE through the two messages, and the capability includes whether the UE has the E-DPCCH power boost capability. Therefore, the RNC is clearly informed whether the UE has the E-DPCCH power boost capability through the RRC connection setup process.

It can be seen that, step 201 may be performed before or after step 202.

Step 203: The RNC configures the resources of the Node B for the UE according to the capability of the UE.

After the RNC receives the RRC Connection Request message sent by the UE, the RNC notifies the Node B to configure the resources of the Node B for the UE according to a part of the capability of the UE carried in the message, that is, the setup of a radio link (RL). Moreover, after the RNC receives the RRC Connection Setup Complete message sent by the UE and is informed of the complete capability of the UE, the RNC re-notifies the Node B to re-configure the resources of the Node B according to the complete capability of the UE, that is, the RL re-configuration.

Through step 201, the RNC is clearly informed whether the Node B has the E-DPCCH power boost capability, and through step 202, the RNC is clearly informed whether the UE has the E-DPCCH power boost capability. Therefore, in step 203, the RNC configures the resources of the Node B optimally for the UE through the RL setup and RL re-configuration processes. For example, when the Node B and the UE both have the E-DPCCH power boost capability, through the RL setup process and the RL re-configuration process, the RNC notifies the Node B to perform the resource configuration, so that the UE uses the E-DPCCH power boost characteristic to perform channel estimation, so as to improve the accuracy of the channel estimation.

Through the solution of this embodiment, the RNC is clearly informed whether the Node B has the E-DPCCH power boost capability, so as to configure the Node B to perform the channel estimation by using the E-DPCCH power boost characteristic for the UE when the UE and the Node B both have the E-DPCCH power boost capability. According to this embodiment, when the RNC configures the Node B to perform the channel estimation by using the E-DPCCH power boost characteristic, the accuracy of the channel estimation of the UE and the Node B is improved. Therefore, the correct rate of the high-speed data transmission between the UE and the Node B is ensured, and the throughput is improved.

Moreover, after the RNC configures the resources of the Node B, it can further configure the resources for the UE, for example, configure the resources for the UE through a radio bearer (RB) setup process or an RB re-configuration process, so that the resource configuration of the UE is consistent with that of the Node B.

Figure 3:
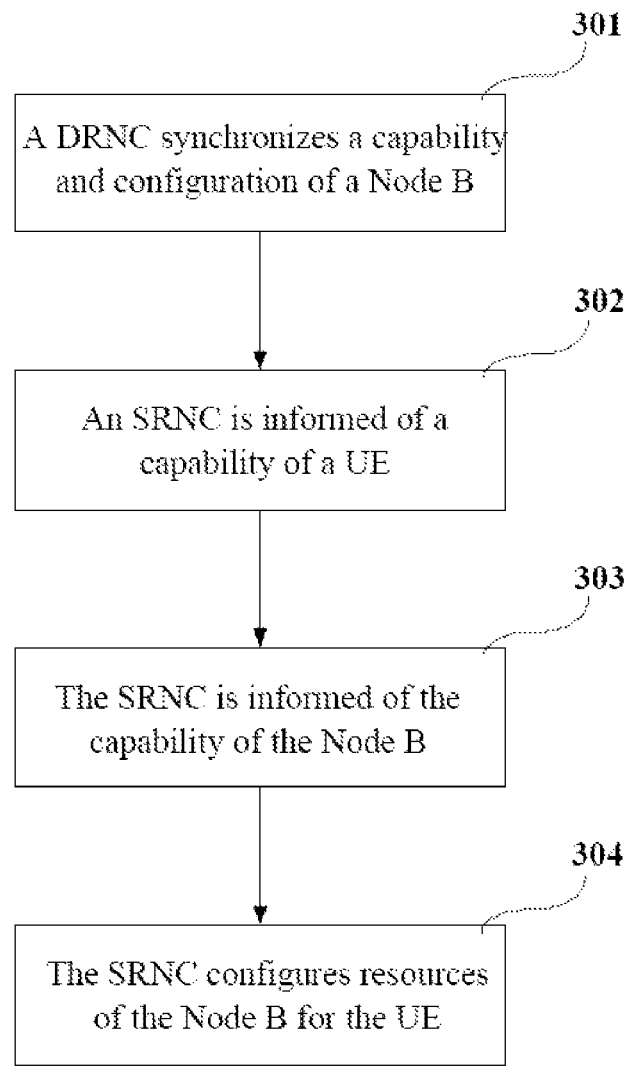
FIG. 3 is a flow chart of a resource configuration method according to a third embodiment of the present invention.

A third embodiment of the present invention is described in detail with reference to FIG. 3. The third embodiment of the present invention provides a resource configuration method during movement of a UE, which includes the following steps:

Step 301: A drift RNC (DRNC) and a Node B synchronize configuration and capability information of the Node B.

The DRNC synchronizes the configuration and the capability information of the Node B with the Node B through an Audit procedure or a Resource Status Indication procedure, or through a combination thereof, so that the DRNC is informed whether the Node B has the E-DPCCH power boost capability, and the specific implementation is as described in step 201 in the second embodiment of the present invention.

Step 302: A serving RNC (SRNC) receives a message sent by the UE, and is informed of capability of the UE.

The UE reports its complete capability to the SRNC through an RRC connection setup process. Accordingly, the SRNC is clearly informed whether the UE has the E-DPCCH power boost capability. The specific implementation is as described in step 202 in the second embodiment of the present invention.

Step 303: The SRNC acquires the capability information of the Node B.

The DRNC forwards the capability information of Node B obtained through the synchronization process to the SRNC, so that the SRNC is clearly informed whether the Node B has the E-DPCCH capability.

For example, the DRNC can add an IE indicating whether the Node B has the E-DPCCH power boost capability in an Uplink Signaling Transfer Indication message to notify the SRNC whether the Node B can perform the channel estimation by using the E-DPCCH power boost characteristic.

For example, the DRNC may also add an IE indicating whether the Node B has the E-DPCCH power boost capability in an RL Response message to notify the SRNC whether the Node B can use the E-DPCCH power boost characteristic to perform the channel estimation.

The DRNC may also forward the capability information of the Node B to the SRNC through other interactive messages with the SRNC, and the present invention is not limited to the two modes described above.

Step 304: The SRNC configures the resources of the Node B for the UE according to the capability of the UE.

In step 303, the SRNC is clearly informed whether the Node B has the E-DPCCH power boost capability through the forwarding of the DRNC. Therefore, when configuring the resources of the Node B for the UE, the RNC configures the Node B to perform or not to perform the channel estimation by using the E-DPCCH power boost characteristic for the UE according to whether the UE has the E-DPCCH power boost capability. The specific implementation of the configuration is as described in step 203 in the second embodiment of the present invention.

In this embodiment, step 301 may be performed before or after step 302, because in step 301, the DRNC acquires the capability information of the Node B, and in step 302, the SRNC acquires the capability information of the UE, and the two steps are completed by the DRNC and the SRNC respectively, and have no specific correlation. Step 303 must be performed after step 301, because the DRNC can forward the capability of the Node B to the SRNC only after the DRNC acquires the capability of the Node B. Step 303 may be performed before or after step 302, because in step 302, the SRNC is informed of the capability of the UE, and in step 303, the DRNC forwards the capability of the Node B to the SRNC, and two steps have no specific correlation.

According to the third embodiment of the present invention, the DRNC is clearly informed whether the Node B has the E-DPCCH power boost capability through an Audit procedure or a Resource Status Indication procedure, or through a combination thereof. The DRNC forwards information about whether the Node B has E-DPCCH power boost capability to the SRNC, so that the SRNC is clearly informed whether the Node B can perform the channel estimation by using the E-DPCCH power boost characteristic. Accordingly, the SRNC is clearly informed whether the UE and the Node B have the E-DPCCH power boost capability. Therefore, when the UE and the Node B both have the E-DPCCH power boost capability, the Node B is configured to perform the channel estimation by using the E-DPCCH power boost characteristic for the UE. Therefore, the accuracy of the channel estimation of the UE under the moving scenario is improved, and the bit error rate in high-speed data transmission under this scenario is reduced.

Furthermore, after configuring the resources of the Node B, the RNC can further configure the resources of the UE, so that the resource configuration of the UE is consistent with that of the Node B.

Figure 4:
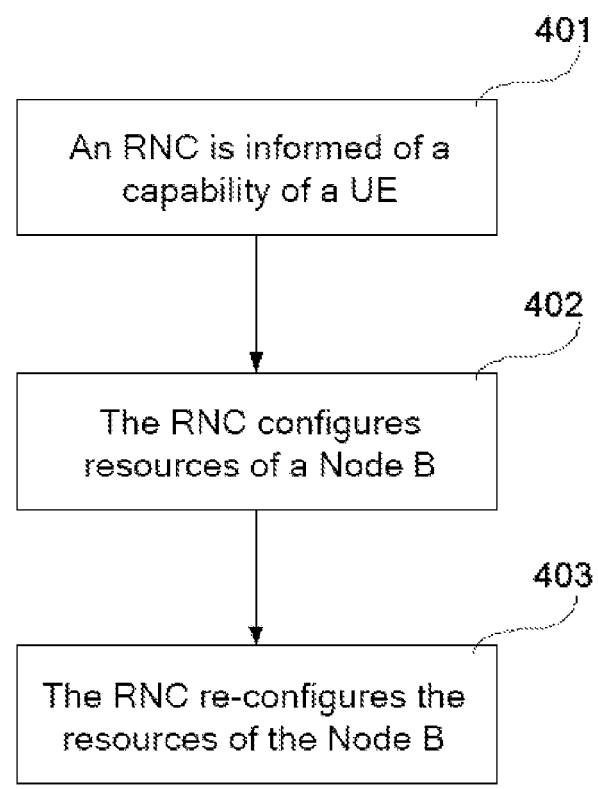
FIG. 4 is a flow chart of a resource configuration method according to a fourth embodiment of the present invention.

A fourth embodiment of the present invention is described in detail with reference to FIG. 4. The fourth embodiment provides a resource configuration method, which includes the following steps:

Step 401: An RNC is informed of capability information of a UE.

During the process for initiating the RRC connection setup, the UE reports the complete capability information thereof to the RNC, and the RNC is clearly informed whether the UE has the E-DPCCH power boost capability. The specific implementation is as described in step 202 in the second embodiment of the present invention.

Step 402: The RNC configures resources of a Node B according to the capability of the UE.

When the RNC synchronize with the Node B the capability information of the Node B, the Node B does not report whether it has the E-DPCCH power boost capability, and at this time, the RNC considers that the Node B has the E-DPCCH power boost capability by default. Therefore, when the RNC configures the resources of the Node B for the UE according to the capability of the UE, if the UE has the E-DPCCH power boost capability, the RNC configures the Node B to perform the channel estimation by using the E-DPCCH power boost characteristic for the UE.

Therefore, during the RL setup process or the RL re-configuration process, the RNC configures parameters related to E-DPCCH power boost for the Node B.

Step 403: The RNC re-configures the resources of the Node B according to feedback of the Node B.

When the Node B does not have the E-DPCCH power boost capability, the Node B returns an RL Setup Failure message to the RNC, and the RL Setup Failure message carries the reason of setup failure. If the RL setup fails because the Node B does not have the E-DPCCH power boost capability, the failure reason returned to the RNC by the Node B includes the information indicating that the Node B does not have the E-DPCCH power boost capability.

After the RNC receives the failure reason returned by the Node B, the RNC is clearly informed that the Node B does not have the E-DPCCH power boost capability, and re-initiates the RL setup and does not configure the parameters related to E-DPCCH power boost for the Node B in the setup request.

In this embodiment, step 403 is optional. If the Node B has the E-DPCCH power boost capability, step 403 is not needed, because when the Node B has the capability, the Node B performs the channel estimation by using the characteristic, and does not return the RL Setup Failure message accordingly.

According to the fourth embodiment of the present invention, during the synchronization process, as the Node B does not report whether it has the E-DPCCH power boost capability, the RNC considers that the Node B has the capability by default. Therefore, when the UE has the E-DPCCH power boost capability, the RNC configures the Node B to perform the channel estimation by using the E-DPCCH power boost characteristic for the UE because the RNC considers that the Node B has E-DPCCH power boost capability by default. Therefore, the quality of the channel estimation is improved, and the bit error rate in high-speed data transmission is reduced.

Furthermore, according to the fourth embodiment of the present invention, when the Node B does not have the E-DPCCH power boost capability, though the RNC considers that the Node B has the capability by default as the Node B does not report whether it has the capability during the synchronization process, the RNC still can be informed of the capability of the Node B during the re-configuration process, so the problem of inconsistent configuration of the Node B and the UE will not occur.

Figure 5:
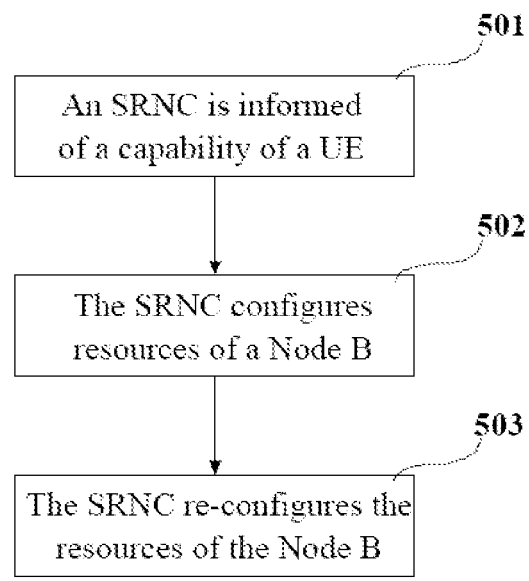
FIG. 5 is a flow chart of a resource configuration method according to a fifth embodiment of the present invention.

Next, a fifth embodiment of the present invention is described in detail with reference to FIG. 5. The fifth embodiment provides a resource configuration method during movement of a UE, which includes the following steps:

Step 501: An SRNC is informed of a capability of a UE, and the specific implementation is as described in step 302 in the third embodiment of the present invention.

Step 502: The SRNC configures resources of a Node B for the UE according to the capability of the current UE.

When the Node B and the DRNC synchronize the capability information of the Node B, the Node B does not report whether it has the E-DPCCH power boost capability, and the DRNC considers that the Node B has the E-DPCCH power boost capability by default.

When the DRNC forwards the capability information of the Node B to the SRNC, it does not forward information about whether the Node B has the E-DPCCH power boost capability, and at this time, the SRNC considers that the Node B has the E-DPCCH power boost capability by default.

Therefore, when the SRNC configures the resources of the Node B for the UE, if the UE has the E-DPCCH power boost capability, the SRNC configures the Node B to perform the channel estimation by using the E-DPCCH power boost characteristic for the UE. In this case, the RL Setup or RL Re-configuration message sent to the DRNC by the SRNC carries parameters related to E-DPCCH power boost, and the RL Setup or RL Re-configuration message sent to the Node B by the DRNC also carries the parameters related to E-DPCCH power boost.

Step 503: The SRNC re-configures the resources of the Node B according to feedback of the Node B.

When the Node B does not have the E-DPCCH power boost capability, if the UE has the capability, the SRNC configures the Node B to perform the channel estimation by using the E-DPCCH power boost characteristic for the UE because the SRNC considers that the Node B has the capability by default.

At this time, as the Node B does not have the E-DPCCH power boost capability, the Node B returns an RL Setup Failure message to the DRNC, and this message carries the failure reason indicating that the Node B does not have the capability. After receiving the RL Setup Failure message returned by the Node B, the DRNC returns an RL Setup Failure message to the SRNC, which carries the failure reason indicating that the Node B does not have the E-DPCCH power boost capability. After the SRNC is informed that the RL setup fails because the Node B does not have the E-DPCCH power boost capability, the SRNC re-initiates the RL setup process or the RL re-configuration process, and does not configure the parameters related to E-DPCCH power boost in an RL Setup Request or RL Re-configuration Request.

According to the fifth embodiment of the present invention, during the synchronization process, as the Node B does not report whether it has the E-DPCCH power boost capability, the DRNC considers that the Node B has the capability by default, so the SRNC also considers that the Node B has the capability by default. Therefore, when the UE has the E-DPCCH power boost capability, the SRNC configures the Node B to perform the channel estimation by using the E-DPCCH power boost characteristic for the UE because the SRNC considers that the Node B has the E-DPCCH power boost capability by default. Therefore, the quality of the channel estimation is improved, and the bit error rate in high-speed data transmission is reduced.

Furthermore, according to the fifth embodiment of the present invention, when the Node B does not have the E-DPCCH power boost capability, during the synchronization process, the DRNC considers that the Node B has the capability by default as the Node B does not report whether it has the capability, and the SRNC also considers that the Node B has the capability accordingly. However, according to the failure reason returned by the Node B, the SRNC can re-configure the resources of the Node B, so the problem of inconsistent configuration of the Node B and the UE will not occur.

It is known from the fourth embodiment and the fifth embodiment of the present invention that, when the RNC of the fourth embodiment is an SRNC, it may be considered that the method of the fourth embodiment can be used to solve the problem of resource configuration under the moving scenario in the fifth embodiment. Because the DRNC does not have the decision-making function in the fifth embodiment and merely acts in a transfer process, the SRNC controls the capability information of the UE and the Node B ultimately, and performs resource configuration according to the capability information of the UE and the Node B.

Figure 6:
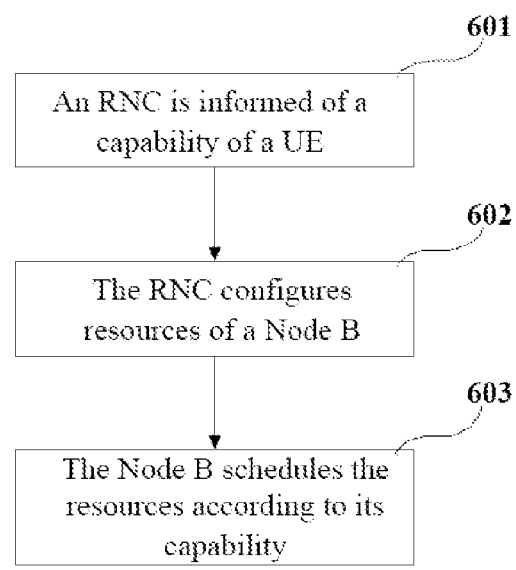
FIG. 6 is a flow chart of a resource configuration method according to a sixth embodiment of the present invention.

Next, a sixth embodiment of the present invention is described in detail with reference to FIG. 6. The sixth embodiment provides a resource configuration method, which includes the following steps:

Step 601: An RNC acquires capability information of a UE, and the specific implementation is as described in step 202 in the second embodiment of the present invention.

Step 602: The RNC configures resources of a Node B for the UE according to a capability of the UE.

During the synchronization process of the RNC and the Node B, the Node B does not report whether it has the E-DPCCH power boost capability. In this case, the RNC considers that the Node B has the E-DPCCH power boost capability by default.

Therefore, when the UE has the E-DPCCH power boost capability, the RNC configures the Node B to perform the channel estimation by using the E-DPCCH power boost characteristic for the UE.

Step 603: The Node B performs resource configuration according to its capability.

When the Node B does not have the E-DPCCH power boost capability, if the UE has the capability, the RNC configures parameters related to E-DPCCH power boost for the Node B because the RNC considers that the Node B has the capability by default. At this time, the Node B performs the channel estimation by using the DPCCH because the Node B does not have the capability.

The resource configuration method provided in this embodiment can also be used under the moving scenario. Under the moving scenario, the RNC in this embodiment is an SRNC, and the SRNC acquires the capability information of the Node B through the forwarding of the DRNC, and when information about whether the Node B has the E-DPCCH power boost capability is not forwarded, the SRNC considers that the Node B has the capability by default. Therefore, when the UE has the E-DPCCH power boost capability, the SRNC configures the parameters related to E-DPCCH power boost for the Node B. The Node B determines whether to perform the channel estimation by using the E-DPCCH power boost characteristic according to the capability of the Node B.

According to the sixth embodiment, the RNC considers that the Node B has the E-DPCCH power boost capability by default when the Node B does not report whether it has the capability, and when the UE has the E-DPCCH power boost capability, the RNC configures the parameters related to E-DPCCH power boost for the Node B. Therefore, when the UE and the Node B both have the E-DPCCH power boost capability, the RNC enables the UE and the Node B to perform the channel estimation by using the characteristic through the resource configuration. Thus, the accuracy of the channel estimation is improved, and the bit error rate in high-speed data transmission is reduced.

Figure 7:
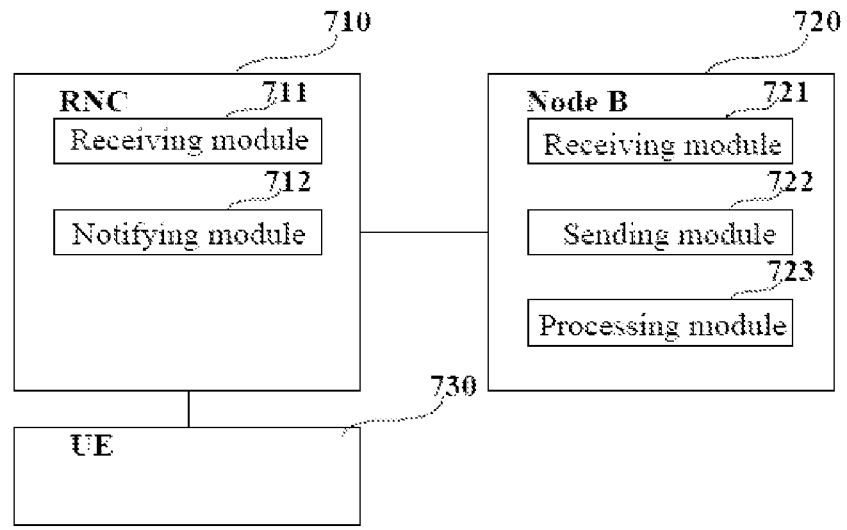
FIG. 7 is a schematic structural diagram of a resource configuration system according to an embodiment of the present invention.

Next, a seventh embodiment of the present invention is described in detail with reference to FIG. 7. The seventh embodiment provides an RNC 710, which includes a receiving module 711 and a notifying module 712.

The receiving module 711 is adapted to receive capability information reported by a Node B 720 and a UE 730, in which the capability information reported by the Node B 720 includes an IE indicating whether the Node B 720 has a channel power boost capability.

The notifying module 712 is adapted to notify the Node B 720 to configure resources for performing channel estimation by using the channel power boost capability for the UE 730 if the UE 730 and the Node B 720 both have the channel power boost capability.

The receiving module 711 is adapted to receive an Audit Response message or a Resource Status Indication message sent by the Node B 720, in which the message carries an IE indicating whether the Node B 720 has an E-DPCCH power boost capability. The receiving module 711 is further adapted to receive IEs indicating the capability of the Node B 720 forwarded by other RNCs. Therefore, the RNC 710 is informed whether the Node B 720 has the E-DPCCH power boost capability.

The receiving module 711 is further adapted to receive an RRC Connection Request message or an RRC Connection Setup Complete message sent by the UE 730, in which the message carries complete capability of the UE 730. Thus, the RNC 710 is informed whether the UE 730 has the E-DPCCH power boost capability.

The notifying module 712 sends a notification for configuring E-DPCCH power boost to the Node B 720 when the UE 730 and the Node B 720 both have the E-DPCCH power boost capability.

Furthermore, the notifying module 712 is also adapted to send parameters related to resource configuration to the UE 730, that is, to notify the UE 730 to configure the corresponding resources.

The RNC provided in the seventh embodiment of the present invention can be clearly informed whether the Node B has the E-DPCCH power boost capability through the capability information sent by the Node B, so as to configure the Node B to perform the channel estimation by using the E-DPCCH power boost characteristic for the UE when the UE and the Node B both have the capability, when the UE is under the moving scenario or the non-moving scenario. Therefore, the accuracy of the channel estimation is improved, and the bit error rate in high-speed data transmission is reduced.

Next, an eighth embodiment of the present invention is described in detail with reference to FIG. 7. The eighth embodiment provides a Node B 720, which includes a receiving module 721, a sending module 722, and a processing module 723.

The receiving module 721 is adapted to receive related parameters for configuring the Node B with the resources for channel estimation sent by an RNC.

The sending module 722 is adapted to send capability information of the Node B 720 to the RNC 710.

The processing module 723 is adapted to add an IE indicating whether the Node B 720 has an E-DPCCH power boost capability in the sent capability information according to whether the Node B 720 has the E-DPCCH power boost capability.

When the receiving module 721 receives a Resource Audit Request message sent by the RNC 710, the processing module 723 adds an IE indicating whether the Node B 720 has the E-DPCCH power boost capability in an Audit Response message according to whether the Node B 720 has the E-DPCCH power boost capability, and sends the Audit Response message through a sending module 722.

The sending module 722 is further adapted to send the capability information of the Node B 720 to other RNCs, and then the RNC forwards the capability information of the Node B 720 to the RNC 710.

The processing module 723 is further adapted to add an IE indicating whether the Node B 720 has the E-DPCCH power boost capability in a Resource Status Indication message for synchronizing resources of the Node B according to whether the Node B 720 has the E-DPCCH power boost capability, and send the Resource Status Indication message through the sending module 722.

The processing module 723 is further adapted to configure resources of the Node B 720 according to configuration parameters received by the receiving module 721 and sent by the RNC 710. For example, when the receiving module 721 receives relevant parameters for configuring the E-DPCCH power boost, the processing module 723 configures the Node B 720 to perform the channel estimation by using the E-DPCCH power boost characteristic.

The Node B provided in the eighth embodiment of the present invention clearly indicates whether the Node B has the E-DPCCH power boost capability when indicating the RNC of the capability information, so that the RNC is clearly informed whether the Node B can perform the channel estimation by using the E-DPCCH power boost characteristic. Therefore, the RNC can configure the Node B to perform the channel estimation by using the E-DPCCH power boost characteristic for the UE when the UE and the Node B both have the E-DPCCH power boost capability. Therefore, the accuracy of the channel estimation is improved, and the bit error rate in high-speed data transmission is reduced.

Figure 8:
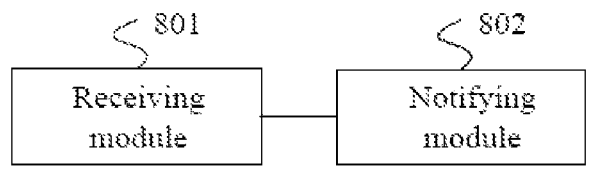
FIG. 8 is a schematic structural diagram of a radio network controller (RNC) according to an embodiment of the present invention.

Next, a ninth embodiment of the present invention is described in detail with reference to the seventh embodiment of the present invention. Referring to FIG. 8, the ninth embodiment provides another RNC, which includes a receiving module 801 and a notifying module 802.

The receiving module 801 is adapted to receive capability information reported by a
Node B and a UE.

The notifying module 802 is adapted to consider that the Node B has an E-DPCCH power boost capability when the capability information reported by the Node B does not include an IE indicating whether the Node B has the capability, and notify the Node B to configure o perform channel estimation by using the channel boost capability or using the DPCCH for the UE according to the capability of the UE and the Node B.

The receiving module 801 receives an Audit Response message or a Resource Status Indication message sent by the Node B or capability information of the Node B forwarded by other RNCs, in which the message does not carry the IE indicating whether the Node B has the E-DPCCH power boost capability. The notifying module 802 considers that the Node B has the capability by default when the message does not carry the IE indicating whether the Node B has the E-DPCCH power boost capability, and notifies the Node B to configure resources for performing the channel estimation by using the channel boost capability for the UE.

The notifying module 802 notifies the Node B to configure the resources for performing the channel estimation by using the channel boost capability for the UE when the capability information of the UE received by the receiving module 801 includes the information indicating that the UE has the E-DPCCH power boost capability.

The receiving module 801 is further adapted to receive an RL Setup Failure feedback sent by the Node B. The notifying module 802 is adapted to send an RL Setup request message or an RL Re-configuration Request message according to failure information indicating that the Node B does not have the E-DPCCH power boost capability contained in the feedback, and the request message does not include relevant parameters for configuring the E-DPCCH power boost, that is, the notifying module 802 notifies the Node B to configure resources for performing the channel estimation by using the DPCCH for the UE.

The RNC provided in the ninth embodiment of the present invention considers that the Node B has the E-DPCCH power boost capability by default when the capability information reported by the Node B does not include whether the Node B has the capability. Therefore, when the UE is under the moving scenario or the non-moving scenario, as long as the UE has the E-DPCCH power boost capability, the RNC configures the Node B to perform the channel estimation by using the E-DPCCH power boost characteristic for the UE. Therefore, the accuracy of the channel estimation is improved, and the bit error rate in high-speed data transmission is reduced.

Furthermore, when the Node B does not have the E-DPCCH power boost capability, the RNC provided in the ninth embodiment can re-perform the RL setup or the RL re-configuration according to the failure reason returned by the Node B, but does not configure the Node B to perform channel estimation by using the E-DPCCH power boost characteristic. Therefore, the consistency of the resource configuration of the Node B and the UE is ensured.

Figure 9:
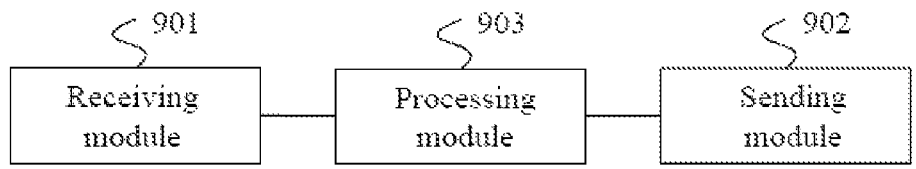
FIG. 9 is a schematic structural diagram of a Node B according to an embodiment of the present invention.

Next, a tenth embodiment of the present invention is described in detail with reference to the eighth embodiment of the present invention. Referring to FIG. 9, the tenth embodiment provides another Node B, which includes a receiving module 901, a sending module 902, and a processing module 903.

The receiving module 901 is adapted to receive a notification for configuring relevant resources sent by an RNC.

The sending module 902 is adapted to send capability information of the Node B to the RNC, in which the capability information does not include information indicating whether the Node B has an E-DPCCH power boost capability.

The processing module 903 is adapted to configure resources of the Node B for performing channel estimation for the UE.

The sending module 902 sends an RL Setup Failure message to the RNC when the Node B does not have the E-DPCCH power boost capability and the relevant parameters for configuring the E-DPCCH power boost are received, in which the message carries the failure reason. The failure reason indicates that the Node B does not have E-DPCCH power boost capability.

The processing module 903 is adapted to configure the Node B to perform the channel estimation by using the E-DPCCH power boost characteristic for the UE when the Node B has the E-DPCCH power boost capability and the relevant parameters for configuring the E-DPCCH power boost are received.

The sending module 902 is further adapted to send the capability information of the Node B to other RNCs, and then the RNCs receiving the capability information may forward the capability information.

The Node B provided in the tenth embodiment of the present invention is configured to perform the channel estimation by using the E-DPCCH power boost characteristic for the UE when the Node B has the E-DPCCH power boost capability and the relevant parameters for configuring E-DPCCH power boost sent by the RNC are received. Therefore, the accuracy of the channel estimation is improved, and the bit error rate in high-speed data transmission is reduced.

Alternatively, when the Node B does not have the E-DPCCH power boost capability, and the relevant parameters for configuring the E-DPCCH power boost sent by the RNC are received, the reason of the RL setup failure that the Node B does not have the E-DPCCH power boost capability is returned, so that the RNC is clearly informed that the Node B does not have the E-DPCCH power boost capability, and in the re-configuration, the RNC does not configure relevant parameters for the Node B. Therefore, the consistency of the resource configuration of the UE and the Node B is ensured.

Figure 10:
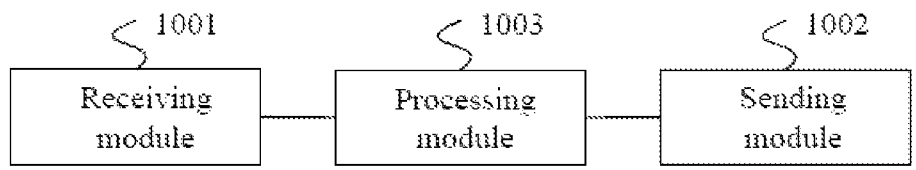
FIG. 10 is a schematic structural diagram of another Node B according to an embodiment of the present invention.

Next, an eleventh embodiment of the present invention is described in detail with reference to the eighth embodiment of the present invention. Referring to FIG. 10, the eleventh embodiment provides another Node B, which includes a receiving module 1001, a sending module 1002, and a processing module 1003.

The receiving module 1001 is adapted to receive a notification for configuring relevant resources sent by an RNC.

The sending module 1002 is adapted to send capability information of the Node B to the RNC, in which the capability information does not include information indicating whether the Node B has an E-DPCCH power boost capability.

The processing module 1003 is adapted to configure the Node B not to perform channel estimation by using the E-DPCCH power boost characteristic when the Node B does not have the E-DPCCH power boost capability and no relevant parameters for configuring the E-DPCCH power boost are received, and configure the Node B to perform the channel estimation by using the E-DPCCH power boost characteristic for the UE when the Node B has the E-DPCCH power boost capability and the relevant parameters for configuring the E-DPCCH power boost are received.

The sending module 1002 is further adapted to send the capability information of the Node B to other RNCs, and then the RNCs receiving the capability information may forward the capability information.

The Node B provided in the eleventh embodiment of the present invention is configured to perform the channel estimation by using the E-DPCCH power boost characteristic for the UE when the Node B has the E-DPCCH power boost capability and the relevant parameters for configuring the E-DPCCH power boost sent by the RNC are received. Therefore, the accuracy of the channel estimation is improved, and the bit error rate in high-speed data transmission is reduced. Alternatively, when the Node B does not have the E-DPCCH power boost capability and the relevant parameters for configuring the E-DPCCH power boost sent by the RNC are received, the Node B provided in the eleventh embodiment of the present invention is configured not to perform the channel estimation by using the E-DPCCH power boost characteristic. Therefore, the RL is set up successfully.

Next, a twelfth embodiment of the present invention is described in detail with reference to FIG. 7. The twelfth embodiment provides a resource configuration system, which includes an RNC 710, a Node B 720, and a UE 730.

The RNC 710 is adapted to receive capability information sent by the Node B 720 and the UE 730, and configure resources of the Node B according to the capability information sent by the Node B 720 and the UE 730.

The Node B 720 is adapted to send the capability information of the Node B 720, and configure the resources of the Node B 720 according to configuration parameters sent by the RNC 710.

The UE 730 is adapted to send the capability information of the UE 730.

The RNC 710 receives information indicating the capability of the Node B 720 sent by the Node B 720 through an Audit procedure or a Resource Status Indication procedure, which includes information indicating whether the Node B 720 has E-DPCCH power boost capability. The RNC 710 sends the relevant parameters for configuring the E-DPCCH power boost to the Node B 720 when the UE 730 and the Node B 720 both have the E-DPCCH power boost capability.

The Node B 720 sends the capability information of the Node B 720 through an Audit Response message or a Resource Status Indication message, which includes an IE indicating whether the Node B has the E-DPCCH power boost capability.

The UE 730 sends the complete capability information thereof to the RNC through an RRC connection setup process.

Furthermore, the Node B 720 can also send the capability information thereof to other RNCs, and at this time, the RNC 710 can receive the capability information of the Node B 720 forwarded by the RNC.

Furthermore, when the capability information sent by the Node B 720 does not include the IE indicating whether the Node B has the E-DPCCH power boost capability, the RNC 710 considers that the Node B 720 has the capability by default, and when the capability information reported by the UE 730 includes the IE indicating that the Node B has the E-DPCCH power boost capability, the RNC 710 sends the relevant parameters for configuring the E-DPCCH power boost to the Node B 720.

Furthermore, when the Node B 720 does not have the E-DPCCH power boost capability and the relevant parameters for configuring the E-DPCCH power boost sent by the RNC 710 are received, the Node B 720 returns the reason of RL setup failure, and the reason indicates that the Node B 720 does not have the E-DPCCH power boost capability.

Furthermore, the RNC 710 is further adapted to re-send the RL Setup Request or the RL Re-configuration Request to the Node B 720 when the failure reason indicating that the Node B does not have the E-DPCCH power boost capability returned by the Node B 720 is received, and the request does not configure the relevant parameters for configuring the E-DPCCH power boost.

Furthermore, when the Node B 720 does not have the E-DPCCH power boost capability and the relevant parameters for configuring the E-DPCCH power boost are received, the Node B 720 configures the UE not to perform the channel estimation by using the E-DPCCH power boost characteristic.

In addition, when combined with the embodiments described above, this embodiment is applicable to the scenario where the UE moves, in which the RNC 710 is an SRNC, and exchanges information with the Node B 720 through a DRNC.

In the system provided in the twelfth embodiment of the present invention, when the capability information of the Node B includes the IE indicating whether the Node B has the E-DPCCH power boost capability, the RNC configures the Node B to perform the channel estimation by using the E-DPCCH power boost characteristic for the UE according to the capability of the UE and the Node B when the UE and the Node B both have the E-DPCCH power boost capability. Therefore, the accuracy of the channel estimation is improved, and the bit error rate in high-speed data transmission is reduced.

Furthermore, in the system provided in the twelfth embodiment, when the capability information of the Node B 720 does not include the IE indicating whether the Node B 720 has the E-DPCCH power boost capability, the RNC 710 considers that the Node B 720 has the E-DPCCH power boost capability by default. Therefore, when the UE 730 has the E-DPCCH power boost capability, the RNC 710 configures the Node B 720 to perform the channel estimation by using the E-DPCCH power boost characteristic for the UE 730. Therefore, the accuracy of the channel estimation is improved, and the bit error rate in high-speed data transmission is reduced.

Furthermore, in the system provided in the twelfth embodiment, when the Node B 720 does not have the E-DPCCH power boost capability and the relevant parameters for configuring the E-DPCCH power boost sent by the RNC 710 are received, according to the returned failure reason indicating that the Node B 720 does not have the E-DPCCH power boost capability, the RNC 710 re-performs the RL setup or the RL re-configuration, and does not configure the Node B 720 to perform the channel estimation by using the E-DPCCH power boost characteristic. Therefore, the consistency of the resource configuration of the Node B 720 and the UE 730 is ensured.

Additionally, when the Node B 720 does not have the E-DPCCH power boost capability and the relevant parameters for configuring the E-DPCCH power boost sent by the RNC 710 are received, the system provided in the twelfth embodiment may configure the Node B 720 not to perform the channel estimation by using the E-DPCCH power boost characteristic. Therefore, the RL is set up successfully.

It should be noted that the above embodiments are merely provided for illustrating the technical solutions of the present invention, but not intended to limit the present invention. Although the present invention has been described in detail with reference to the foregoing embodiments, it is apparent that those skilled in the art can make various modifications to the technical solutions according to the embodiments or make equivalent replacements to some technical features of the embodiments of the invention, and such modifications and replacements do not make the essence of the technical solutions depart from the spirit and scope of the technical solutions according to the embodiments of the present invention.

What is claimed is:

1. A communications system comprising:
   a base station; and
   a radio network controller (RNC),
   wherein the RNC is configured to:
      obtain, from a user equipment (UE), capability information of the UE, the capability information of the UE including information relating to the UE's Enhanced Dedicated Channel (E-DCH) Dedicated Physical Control Channel (E-DPCCH) power boost capability,
      designate the base station with a default of supporting E-DPCCH power boost capability if the UE supports E-DPCCH power boost capability, without information from the base station concerning whether the base station supports the E-DPCCH power capability, and
      allocate resources to the base station in accordance with the default designation of the base station's E-DPCCH power boost capability, enabling the base station to use the E-DPCCH power boost capability to perform channel estimation for the UE.

2. The system of claim 1, wherein RNC is configured to allocate the resources by transmitting to the base station configuration parameter information related to the default designation of the base station's E-DPCCH power boost capability.

3. The system of claim 2, wherein the RNC is configured to transmit the configuration parameter information to the base station during a radio link (RL) setup procedure.

4. The system of claim 3, wherein the RNC is configured to include the configuration parameter information in an RL setup request message transmitted from the RNC to the base station.

5. The system of claim 2, wherein the RNC is configured to transmit the configuration parameter information to the base station during a RL re-configuration procedure.

6. The system of claim 5, wherein the RNC is configured to include the configuration parameter information in an RL re-configuration request message transmitted from the RNC to the base station.

7. The system of claim 1, wherein the base station is further configured to return a failure message to the RNC after the allocation of the resources, if the base station does not support the E-DPCCH power boost capability.

8. The system of claim 7, wherein the failure message includes failure cause indicating that the base station does not support the E-DPCCH power boost capability.

9. A method comprising:
   obtaining, by the RNC, capability information of a user equipment (UE) from the UE, the capability information of the UE including information relating to the UE's Enhanced Dedicated Channel (E-DCH) Dedicated Physical Control Channel (E-DPCCH) power boost capability;
   designating, by the RNC, the base station with a default of supporting E-DPCCH power boost capability if the UE supports E-DPCCH power boost capability, without information from the base station concerning whether the base station supports E-DPCCH power capability; and
   configuring, by the RNC, resources to the base station in accordance with the default designation of the base station's E-DPCCH power boost capability to enable the base station to use the E-DPCCH power boost capability to perform channel estimation for the UE.

10. The method of claim 9, wherein the configuring step comprises:
    transmitting, by the RNC, configuration parameter information related to the default designation of the base station's E-DPCCH power boost capability to the base station.

11. The method of claim 10, wherein the configuration parameter information is transmitted to the base station during a radio link (RL) setup procedure.

12. The method of claim 11, wherein the configuration parameter information is included in an RL setup request message.

13. The method of claim 10, wherein the configuration parameter information is transmitted to the base station during a RL re-configuration procedure.

14. The method of claim 13, wherein the configuration parameter information is included in an RL re-configuration request message.

15. The method of claim 9, wherein the base station does not support the E-DPCCH power boost capability, the method further comprises after the configuring step:
    returning a failure message from the base station to the RNC.

16. The method of claim 15, wherein the failure message includes failure cause indicating that the base station does not support the E-DPCCH power boost capability.

* * * * *